(12) United States Patent
Vaysse

(10) Patent No.: US 6,897,574 B2
(45) Date of Patent: May 24, 2005

(54) GATE DRIVER ASIC FOR AN AUTOMOTIVE STARTER/ALTERNATOR

(75) Inventor: Bertrand Vaysse, Toulouse (FR)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/737,264

(22) Filed: Dec. 15, 2003

(65) Prior Publication Data

US 2004/0189219 A1 Sep. 30, 2004

Related U.S. Application Data

(60) Provisional application No. 60/433,472, filed on Dec. 13, 2002.

(51) Int. Cl.[7] .................................................. F02N 11/04
(52) U.S. Cl. .............................. 290/31; 290/46; 318/151
(58) Field of Search ................................. 318/139, 140, 318/148, 151–153; 290/27, 28, 31, 32, 36 R, 46, 47

(56) References Cited

U.S. PATENT DOCUMENTS

| 6,396,165 | B1 | * | 5/2002 | Nagano et al. | 307/10.6 |
| 6,555,927 | B1 | * | 4/2003 | Suzuki et al. | 290/34 |
| 6,687,580 | B2 | * | 2/2004 | Suzuki et al. | 701/22 |
| 6,722,332 | B2 | * | 4/2004 | Kojima | 123/179.3 |

* cited by examiner

Primary Examiner—Bentsu Ro
(74) Attorney, Agent, or Firm—Ostrolenk, Faber, Gerb & Soffen, LLP

(57) ABSTRACT

A starter/alternator system for an engine and a battery of an automobile are provided. The system includes a starter/alternator machine; a three phase MOSgate control inverter/bridge electrically coupled to the starter/alternator machine, the three phase MOSgate control inverter/bridge including bridge connected MOSgated devices; a control ASIC electrically coupled to the bridge connected MOSgated devices of the three phase MOSgate control inverter/bridge, the control ASIC including all control circuitry required to control the starter/alternator machine; and a motor drive circuit electrically coupled to the control ASIC.

13 Claims, 3 Drawing Sheets

GATE DRIVER ASIC FOR AN AUTOMOTIVE STARTER/ALTERNATOR

RELATED APPLICATIONS

This application is a Continuation-in-Part Application of U.S. application Ser. No. 10/734,475, filed on Dec. 12, 2003, and entitled "GATE DRIVER ASIC FOR AN AUTOMOTIVE STARTER/ALTERNATOR," which is based on and claims the benefit of U.S. Provisional Application No. 60/433,472 filed on Dec. 13, 2002, entitled GATE DRIVER ASIC FOR AN AUTOMOTIVE STARTER/ALTERNATOR, the entire contents of both of which are expressly incorporated herein by reference.

FIELD OF THE INVENTION

This invention relates to automotive starter alternators and more specifically relates to a novel application specific integrated circuit (ASIC) for a starter/alternator.

BACKGROUND OF THE INVENTION

Automotive starter alternators are well known and employ a power supply which contains a three phase bridge made of MOSgated devices such as power MOSFETs and/or IGBTs. The gates of these MOSGATED devices are suitably controlled by various control circuits, under the influence of a motor drive controller. Until now, the controls for the MOSgated devices have included numerous segregated circuit assemblies, many of which are implemented on separate Printed Circuit Boards (PCBs) in separate wire harnesses.

BRIEF DESCRIPTION OF THE INVENTION

It is an object of the present invention to overcome the disadvantages of the prior art by providing a starter/alternator system for an engine and a battery of an automobile, which employs a novel control ASIC including all control "intelligence" (i.e., control circuitry) required to control a starter/alternator machine. More specifically, the system includes a starter/alternator machine; a three phase MOSgate control inverter/bridge electrically coupled to the starter/alternator machine, the three phase MOSgate control inverter/bridge including bridge connected MOSgated devices; a control ASIC electrically coupled to the bridge connected MOSgated devices of the three phase MOSgate control inverter/bridge, the control ASIC including all control circuitry required to control the starter/alternator machine; and a motor drive circuit electrically coupled to the control ASIC.

In accordance with an example embodiment of the present invention, the control ASIC is capable of operating in a variety of modes. These modes may include, for example, "a starter mode," in which the control ASIC drives the bridge connected MOSgated devices of a three phase MOSgate control inverter/bridge 115, such that gate-to-source voltages of the bridge connected MOSgated devices are held for a duration of a start-up sequence. The variety of modes may also include, for example, an "alternator mode," in which the control ASIC drives the bridge connected MOSgated devices of the three phase MOSgate control inverter/bridge to rectify an alternating voltage from the starter/alternator machine.

BRIEF DESCRIPTION OF THE INVENTION

Figure 1:
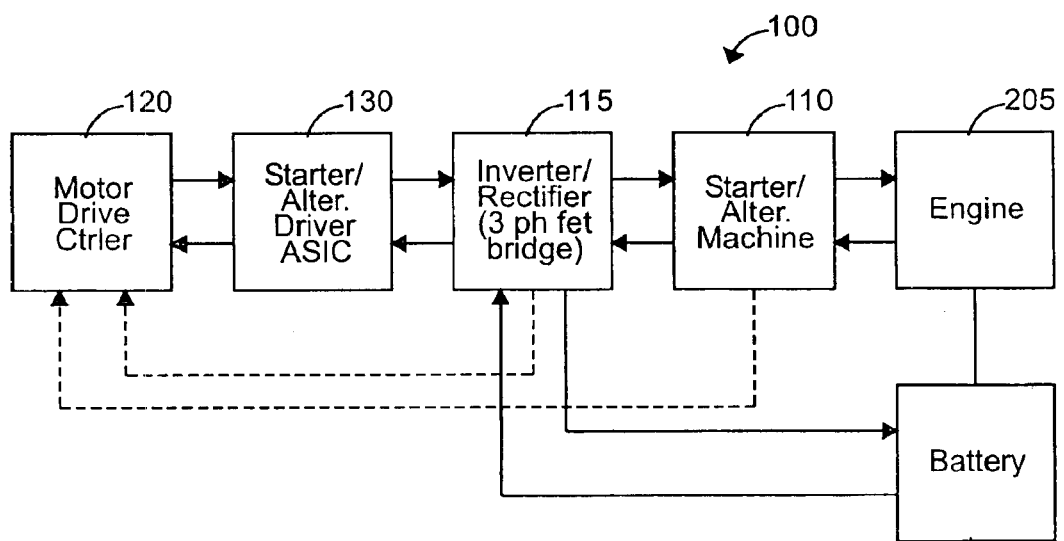
FIG. 1 is a block diagram of a starter/alternator system employing a novel control ASIC according to the present invention.

Referring to the Figure, there is seen a block diagram of a starter/alternator system 100 according to the present invention. Starter/alternator system 100 is configured to start an automotive vehicle engine 205 and to charge an automobile battery 210. Starter/alternator system 100 includes a starter/alternator machine 110, a three phase MOSgate control inverter/bridge 115 electrically coupled to starter/alternator machine 110, a novel control ASIC 130 electrically coupled to three phase MOSgate control inverter/bridge 115, and a motor drive circuit 120 electrically coupled to novel control ASIC 130. In operation, engine 205 is operated by the starter/alternator machine 110, which is driven, in turn, by the output of the three phase MOSgate control inverter/bridge 115 in a conventional manner.

In accordance with the present invention, however, the bridge connected MOSgated devices (not shown) of three phase MOSgate control inverter/bridge 115 are switched under the control of a single novel ASIC 130, in which resides all control "intelligence" (i.e., control circuitry) required to control starter/alternator machine 110. Novel ASIC 130 responds to input control signals from motor drive circuit 120, which receives feedback signals 125a, 125b from the output of three phase MOSgate control inverter/bridge 115 and starter/alternator machine 110. Novel ASIC 130 is capable of machine winding and excitation field grounding when the automobile engine is stopped and of measuring the temperature of the substrate of novel ASIC 130. Novel ASIC 130 may also be provided with an additional high side driver for field transistor, and may be designed to operate in a variety of different voltage networks (e.g., 12V and 42V systems) in a wide operating temperature range (e.g., −40° C. to 165° C.).

Novel ASIC 130 is configured to operate in various operating modes. In accordance with one embodiment of the present invention, novel ASIC 130 is configured to operate in a "starter mode," in which novel ASIC 130 drives three phase MOSgate control inverter/bridge 115, such that the gate-to-source voltages of the bridge connected MOSgated devices (not shown) of three phase MOSgate control inverter/bridge 115 are held for the duration of the start-up sequence. This may be accomplished, for example, using a bootstrap and/or charge pump technique. The "starter mode" of operation may be initiated, for example, by an external microprocessor. For this purpose, novel ASIC 130 may be provided with a control input (e.g., input#2 in the table below) configured to receive a "starter mode" signal from the external microprocessor input (when the car engine is to be cranked). Alternatively, "starter mode" may be initiated by asserting and/or deasserting one or more other input signals (e.g., at least one input signal IN, . . . , IN6 in the table below). In "starter mode," novel ASIC 130 helps.

In accordance with another example embodiment of the present invention, novel ASIC 130 is also configured to operate in an "alternator mode," in which novel ASIC 130 drives the gate nodes of the bridge connected MOSgated devices (not shown) of three phase MOSgate control inverter/bridge 115 to rectify the alternating voltage from starter/alternator machine 110. Similar to "starter mode," "alternator mode" may be initiated, for example, by an external microprocessor. For this purpose, the "starter mode" control input (e.g., input#2 in the table below) connected to the external microprocessor may be used to "toggle" between "starter mode" and "alternator mode" (e.g., logic "0" for "starter mode," and logic "1" for "alternator mode," or vice versa). Alternatively, "alternator mode" may be initiated by asserting and/or deasserting one or more other input signals (e.g., at least one input signal IN, . . . , IN6 in the table below). For example, in accordance with another example embodiment of the present invention, "alternator mode" is initiated by tying to ground all input signals (e.g., IN, . . . , IN6 of#1 in the table below). In "alternator mode," novel ASIC 130 should be capable of synchronous rectification either by a Vds sensing scheme (e.g., turn on MOSFETs at Vds<Vo (typically Vo=−400 mV) and then turnoff MOSFETs based on phase voltage measurements). Novel ASIC 130 should also be capable of providing controlled avalanche (through a zener from Drain to Gate) during a load dump condition.

In accordance with another example embodiment of the present invention, novel ASIC 130 includes an electrical pin layout as described in the table below:

| I/O | # | Type | Name | Description |
|---|---|---|---|---|
| I | 1 | Logic | IN, . . . , IN6 | Q1, . . . , Q6 inputs |
| I | 2 | Logic | S/A TOGGLE | Toggles between starter and alternator mode |
| I | 3 | Logic | WG | Grounds machine windings and excitation field |
| I | 4 | Analog | D1, D3, D5, S1/D2, S3/D4, S5/D6, S2, S4, S6 | Drain and source voltage for all MOSFETs. Used to turn on/off the MOSFETs in alternator mode. |
| I | 5 | Power | Vcc, gnd | Power pins |
| O | 6 | Gate signal | G1, . . . , G6 | Gate voltage |
| O | 7 | Gate signal | S1, . . . , S6 | Source voltage (these could be combined with signals above) |
| O | 8 | Analog | T | Substrate temperature |

Figure 2:
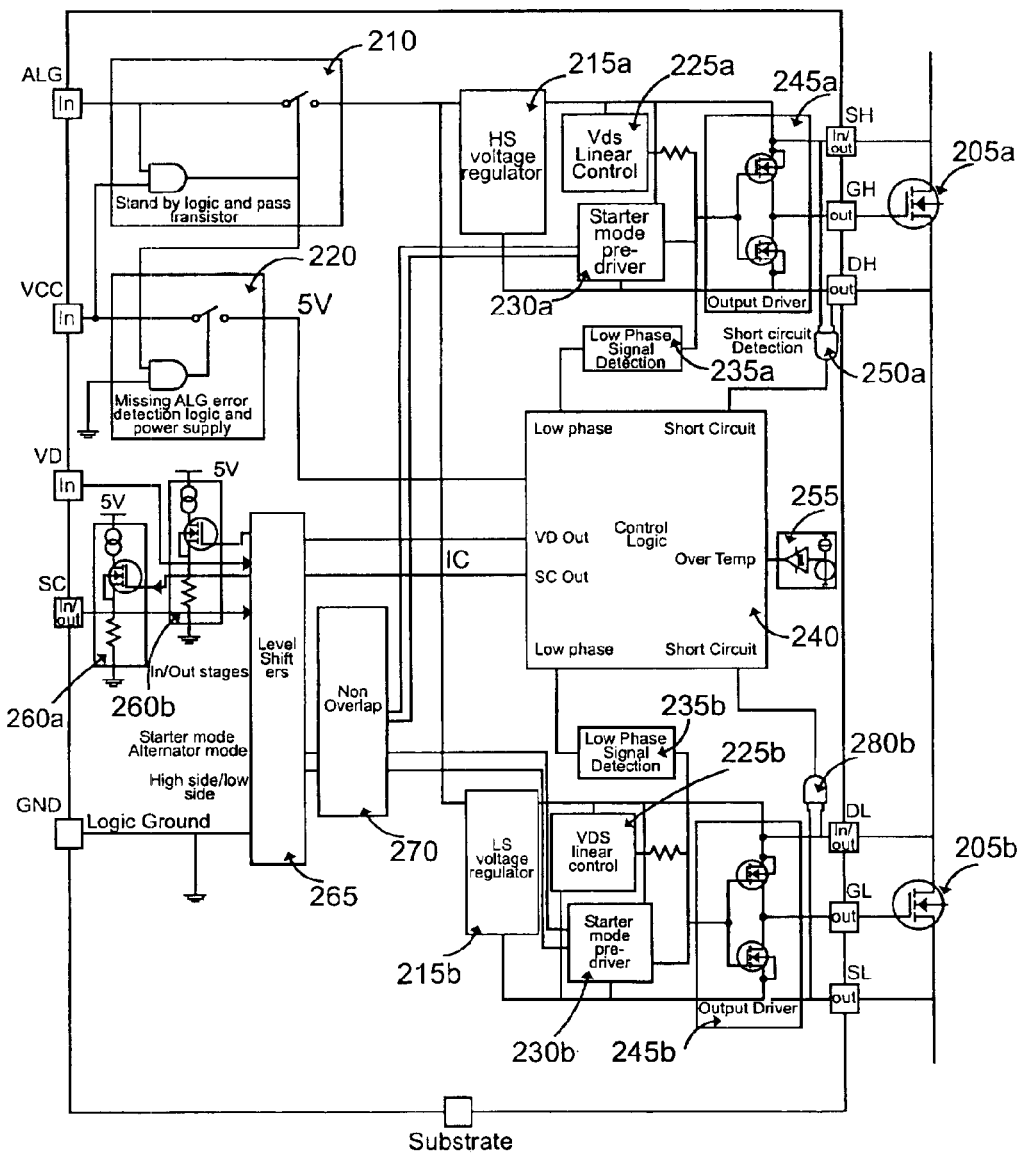
FIG. 2 is a block diagram of an example circuit assembly according to the present invention.
Figure 3:
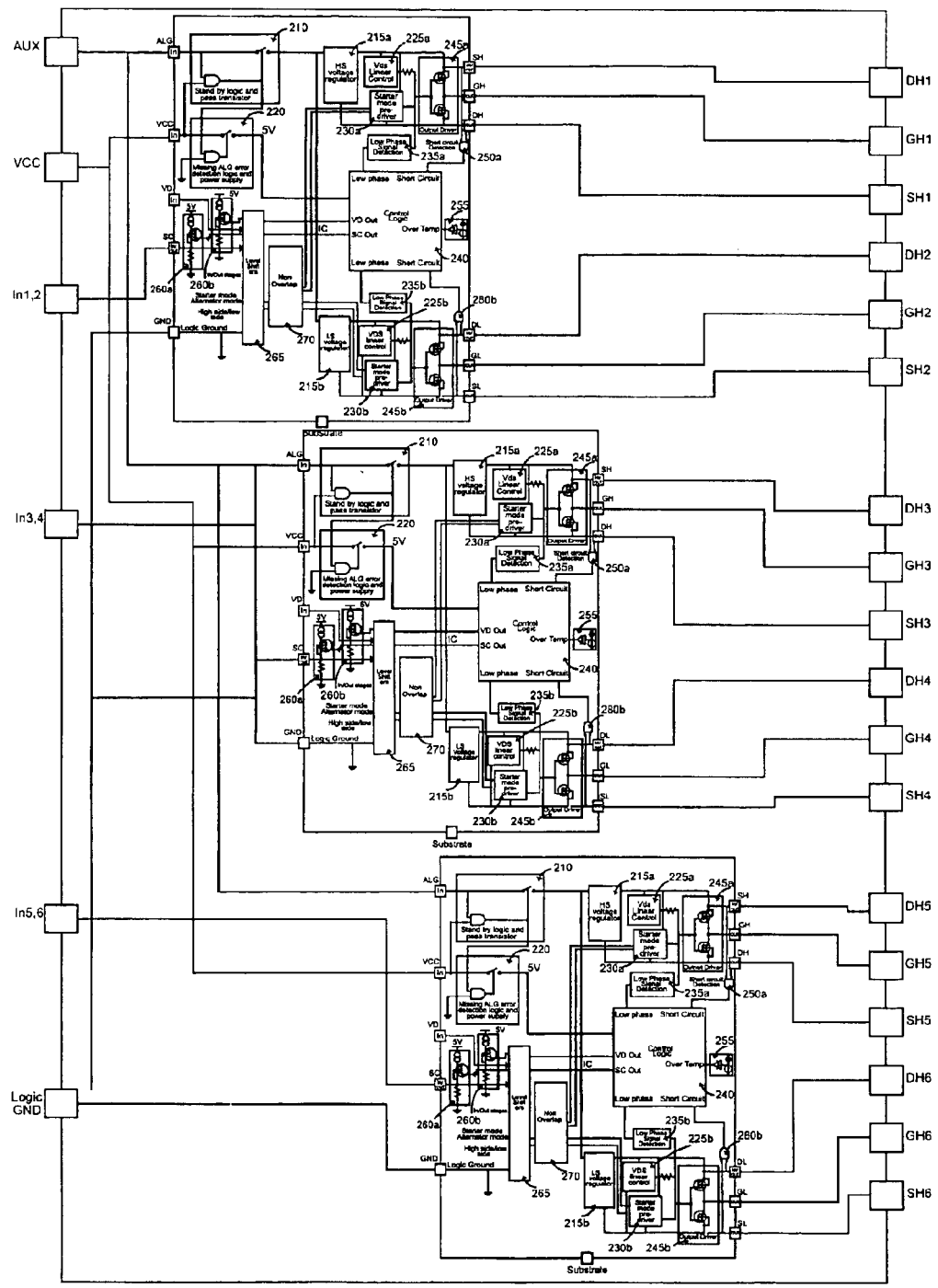
FIG. 3 is a block diagram of an example novel ASIC 300 according to the present invention.

Referring now to FIG. 2, there is seen a block diagram of an exemplary circuit assembly 290 according to the present invention. As shown in FIG. 2, circuit assembly 290 is coupled to the gate nodes of MOSgated devices 205a, 205b of three phase MOSgate control inverter/bride 115 for driving MOSgated devices 205a, 205b in at least one mode, for example, a "starter mode" and an "alternator mode," as described above. Novel ASIC 130 includes a standby logic and pass circuit 210 electrically coupled to an ALG input and Vcc; a missing ALG error detection and power supply circuit 220 electrically coupled to Vcc and ground; a control logic circuit 240 electrically coupled to missing ALG error detection and power supply circuit 220; high-side and low-side voltage regulator circuits 215a, 215b electrically coupled to standby logic and pass circuit 210; high-side and low-side Vds linear control circuits 225a, 225b electrically coupled to high-side and low-side voltage regulator circuits 215a, 215b, respectively; high-side and low-side starter mode pre-driver circuits 230a, 230b electrically coupled to high-side and low-side voltage regulator circuits 215a, 215b, respectively; high-side and low-side output driver circuits 245a, 245b electrically coupled to high-side and low-side voltage regulator circuits 215a, 215b, high-side and low-side Vds linear control circuits 225a, 225b, and high-side and low-side starter mode pre-driver circuits 230a, 230b, respectively; high-side and low-side low phase signal detection circuit 235a, 235b electrically coupled to high-side and low-side voltage regulator circuits 215a, 215b, high-side and low-side Vds linear control circuits 225a, 225b, high-side and low-side output driver circuits 245a, 245b, and high-side and low-side starter mode pre-driver circuits 230a, 230b, respectively; high-side and low-side short circuit detection circuits 250a, 250b electrically coupled to high-side and low-side output driver circuits 245a, 245b, respectively, and to control logic circuit 240; an over-temperature circuit 255 electrically coupled to control logic circuit 240; input/output stage circuits 260a, 260b electrically coupled to VD and SC control inputs; a lever shifting circuit 265 electrically coupled to input/output stage circuits 260a, 260b and to a ground input; and a non-overlap circuit 270 electrically coupled to lever shifting circuit 265 and high-side and low-side starter mode pre-driver circuits 230a, 230b. Referring now to FIG. 3, there is seen an exemplary novel ASIC 300 according to the present invention. As shown in FIG. 3, novel ASIC 300 includes three circuit assemblies 290 connected in parallel.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A starter/alternator system for an engine and a battery of an automobile, comprising:
 a starter/alternator machine;
 a three phase MOSgate control inverter/bridge electrically coupled to the starter/alternator machine, the three phase MOSgate control inverter/bridge including bridge connected MOSgated devices;
 a control ASIC electrically coupled to the bridge connected MOSgated devices of the three phase MOSgate control inverter/bridge, the control ASIC including all control circuitry required to control the starter/alternator machine; and
 a motor drive circuit electrically coupled to the control ASIC.

2. The starter/alternator system of claim 1, wherein the motor drive circuit includes feedback inputs electrically coupled to respective feedback signals.

3. The starter/alternator system of claim 2, wherein the feedback signals include a first feedback signal generated by the three phase MOSgate control inverter/bridge and a second feedback signal generated by the starter/alternator machine.

4. The starter/alternator system of claim 1, wherein the control ASIC is capable of operating in a plurality of different voltage networks.

5. The starter/alternator system of claim 4, wherein the plurality of different voltage networks include a 12 volt voltage network and a 42 volt voltage network.

6. The starter/alternator system of claim 1, wherein the control ASIC is capable of operating in a wide operating temperature range.

7. The starter/alternator system of claim 6, wherein the temperature range is −40° C. to 165° C.

8. The starter/alternator system of claim 1, wherein the control ASIC is capable of operating in a plurality of modes.

9. The starter/alternator system of claim 8, wherein the plurality of modes include a starter mode, the control ASIC driving the bridge connected MOSgated devices of three phase MOSgate control inverter/bridge in the starter mode, such that gate-to-source voltages of the bridge connected MOSgated devices are held for a duration of a start-up sequence.

10. The starter/alternator system of claim 9, wherein the control ASIC includes at least one control input, the starter mode of the control ASIC being initiated by the assertion of the at least one control input.

11. The starter/alternator system of claim 8, wherein the plurality of modes include an alternator mode, the control ASIC driving the bridge connected MOSgated devices of three phase MOSgate control inverter/bridge in the alternator mode to rectify an alternating voltage from the starter/alternator machine.

12. The starter/alternator system of claim 9, wherein the control ASIC includes at least one control input, the alternator mode of the control ASIC being initiated by the assertion of the at least one control input.

13. A control ASIC for use in a starter/alternator system for an engine and a battery of an automobile, the control ASIC comprising:

an ASIC configured to electrically coupled to bridge connected MOSgated devices of a three phase MOSgate control inverter/bridge of the starter/alternator system, the control ASIC including all control circuitry required to control a starter/alternator machine of the starter/alternator system.

* * * * *